United States Patent
Schofield

(10) Patent No.: US 8,466,806 B2
(45) Date of Patent: *Jun. 18, 2013

(54) ALERT SYSTEM FOR A VEHICLE

(75) Inventor: Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/483,996

(22) Filed: Jun. 12, 2009

(65) Prior Publication Data

US 2009/0243825 A1 Oct. 1, 2009

Related U.S. Application Data

(63) Continuation of application No. 12/058,155, filed on Mar. 28, 2008, now Pat. No. 7,551,103, which is a continuation of application No. 11/735,782, filed on Apr. 16, 2007, now Pat. No. 7,355,524, which is a continuation of application No. 11/108,474, filed on Apr. 18, 2005, now Pat. No. 7,205,904, which is a continuation of application No. 10/209,173, filed on Jul. 31, 2002, now Pat. No. 6,882,287.

(60) Provisional application No. 60/309,022, filed on Jul. 31, 2001.

(51) Int. Cl.
*G08G 1/16* (2006.01)

(52) U.S. Cl.
USPC ........... 340/903; 340/435; 340/937; 348/119; 348/120; 348/148; 348/149

(58) Field of Classification Search
USPC .......... 340/937, 435, 903, 148, 149; 348/119, 348/120
See application file for complete search history.

(56) References Cited

U.S. PATENT DOCUMENTS

| | | |
|---|---|---|
| 4,348,652 A | 9/1982 | Barnes et al. |
| 4,600,913 A | 7/1986 | Caine |
| 4,907,870 A | 3/1990 | Brucker |
| 4,971,430 A | 11/1990 | Lynas |
| 4,975,703 A | 12/1990 | Delisle et al. |
| 5,097,362 A | 3/1992 | Lynas |
| 5,177,685 A | 1/1993 | Davis et al. |
| 5,189,561 A | 2/1993 | Hong |
| 5,225,827 A | 7/1993 | Persson |
| 5,339,075 A | 8/1994 | Abst et al. |
| 5,386,285 A | 1/1995 | Asayama |
| 5,434,927 A | 7/1995 | Brady et al. |
| 5,467,284 A | 11/1995 | Yoshioka et al. |
| 5,500,766 A | 3/1996 | Stonecypher |

(Continued)

*Primary Examiner* — Brent Swarthout
(74) *Attorney, Agent, or Firm* — Gardner, Linn, Burkhart & Flory, LLP

(57) ABSTRACT

An alert system for a vehicle includes a forward facing camera having a field of view that encompasses the road ahead of and traveled on by the equipped vehicle, and may include a radar detector having a field of view to the side of and rearward of the equipped vehicle as it travels along the road and/or an image-based detector having a field of view to the side of and rearward of the equipped vehicle as it travels along the road. The alert system determines a lane change into a side lane by the equipped vehicle and detects a vehicle in that side lane, and an alert is generated to the driver of the equipped vehicle. The alert may be generated irrespective of the status of a turn signal of the equipped vehicle.

24 Claims, 5 Drawing Sheets

U.S. PATENT DOCUMENTS

| | | | |
|---|---|---|---|
| 5,550,677 A | 8/1996 | Schofield et al. | |
| 5,581,464 A | 12/1996 | Woll et al. | |
| 5,612,883 A * | 3/1997 | Shaffer et al. | 701/300 |
| 5,646,612 A | 7/1997 | Byon | |
| 5,670,935 A * | 9/1997 | Schofield et al. | 340/461 |
| 5,673,019 A | 9/1997 | Dantoni | |
| 5,680,123 A | 10/1997 | Lee | |
| 5,699,057 A | 12/1997 | Ikeda et al. | |
| 5,715,093 A | 2/1998 | Schierbeek et al. | |
| 5,796,094 A | 8/1998 | Schofield et al. | |
| 5,877,897 A | 3/1999 | Schofield et al. | |
| 5,949,331 A | 9/1999 | Schofield et al. | |
| 6,031,484 A * | 2/2000 | Bullinger et al. | 342/72 |
| 6,037,860 A | 3/2000 | Zander et al. | |
| 6,037,975 A | 3/2000 | Aoyama | |
| 6,057,754 A | 5/2000 | Kinoshita et al. | |
| 6,097,023 A | 8/2000 | Schofield et al. | |
| 6,107,939 A * | 8/2000 | Sorden | 340/901 |
| 6,151,539 A | 11/2000 | Bergholz et al. | |
| 6,201,642 B1 | 3/2001 | Bos | |
| 6,222,447 B1 | 4/2001 | Schofield et al. | |
| 6,243,003 B1 | 6/2001 | DeLine et al. | |
| 6,278,377 B1 | 8/2001 | DeLine et al. | |
| 6,292,752 B1 * | 9/2001 | Franke et al. | 701/300 |
| 6,311,119 B2 | 10/2001 | Sawamoto et al. | |
| 6,313,454 B1 | 11/2001 | Bos et al. | |
| 6,320,176 B1 | 11/2001 | Schofield et al. | |
| 6,324,450 B1 | 11/2001 | Iwama | |
| 6,353,392 B1 | 3/2002 | Schofield et al. | |
| 6,362,729 B1 | 3/2002 | Hellmann et al. | |
| 6,363,326 B1 | 3/2002 | Scully | |
| 6,366,236 B1 | 4/2002 | Farmer et al. | |
| 6,388,565 B1 | 5/2002 | Bernhard et al. | |
| 6,388,580 B1 | 5/2002 | Graham | |
| 6,396,397 B1 | 5/2002 | Bos et al. | |
| 6,411,204 B1 | 6/2002 | Bloomfield et al. | |
| 6,420,975 B1 | 7/2002 | DeLine et al. | |
| 6,424,273 B1 | 7/2002 | Gutta et al. | |
| 6,433,676 B2 | 8/2002 | DeLine et al. | |
| 6,441,748 B1 | 8/2002 | Takagi et al. | |
| 6,485,155 B1 | 11/2002 | Duroux et al. | |
| 6,683,969 B1 | 1/2004 | Nishigaki et al. | |
| 6,690,268 B2 | 2/2004 | Schofield et al. | |
| 6,728,623 B2 | 4/2004 | Takenaga et al. | |
| 6,784,828 B2 | 8/2004 | Delcheccolo et al. | |
| 6,824,281 B2 | 11/2004 | Schofield et al. | |
| 6,873,253 B2 | 3/2005 | Veziris | |
| 6,882,287 B2 | 4/2005 | Schofield | |
| 6,888,447 B2 | 5/2005 | Hori et al. | |
| 6,906,639 B2 | 6/2005 | Lemelson et al. | |
| 7,205,904 B2 | 4/2007 | Schofield | |
| 7,355,524 B2 * | 4/2008 | Schofield | 340/903 |
| 7,551,103 B2 * | 6/2009 | Schofield | 340/903 |
| 2002/0116126 A1 | 8/2002 | Lin | |
| 2002/0159270 A1 | 10/2002 | Lynam et al. | |
| 2003/0025597 A1 | 2/2003 | Schofield | |
| 2004/0016870 A1 | 1/2004 | Pawlicki et al. | |
| 2005/0046978 A1 | 3/2005 | Schofield et al. | |

* cited by examiner

ALERT SYSTEM FOR A VEHICLE

CROSS-REFERENCE TO RELATED APPLICATIONS

This application is a continuation of U.S. patent application Ser. No. 12/058,155, filed Mar. 28, 2008, now U.S. Pat. No. 7,551,103, which is a continuation of U.S. patent application Ser. No. 11/735,782, filed Apr. 16, 2007, now U.S. Pat. No. 7,355,524, which is a continuation of U.S. patent application Ser. No. 11/108,474, filed Apr. 18, 2005, now U.S. Pat. No. 7,205,904, which is a continuation of U.S. patent application Ser. No. 10/209,173, filed on Jul. 31, 2002, now U.S. Pat. No. 6,882,287, which claims priority from U.S. provisional application Ser. No. 60/309,022, filed on Jul. 31, 2001, the disclosures of which are hereby incorporated herein by reference in their entireties.

TECHNICAL FIELD OF INVENTION

This invention relates to object detection adjacent a motor vehicle as it travels along a highway, and more particularly relates to imaging systems that view the blind spot adjacent a vehicle and/or that view the lane adjacent the side of a vehicle and/or view the lane behind or forward the vehicle as it travels down a highway.

BACKGROUND OF INVENTION

Camera-based systems have been proposed, such as in commonly assigned patent application Ser. No. 09/372,915, filed Aug. 12, 1999, now U.S. Pat. No. 6,396,397, by Bos et al. for a VEHICLE IMAGING SYSTEM WITH STEREO IMAGING, the disclosure of which is hereby incorporated herein by reference, that detect and display the presence, position of, distance to and rate of approach of vehicles, motorcycles, bicyclists, and the like, approaching a vehicle such as approaching from behind to overtake in a side lane to the vehicle. The image captured by such vehicular image capture systems can be displayed as a real-time image or by icons on a video screen, and with distances, rates of approach and object identifiers being displayed by indicia and/or overlays, such as is disclosed in U.S. Pat. Nos. 5,670,935; 5,949,331; and 6,222,447, the disclosures of which are hereby incorporated herein by reference. Such prior art systems work well. However, it is desirable for a vehicle driver to have visual access to the full 360 degrees surrounding the vehicle. It is not uncommon, however, for a vehicle driver to experience blind spots due to the design of the vehicle bodywork, windows and the rearview mirror system. A blind spot commonly exists between the field of view available to the driver through the exterior rearview mirror and the driver's peripheral limit of sight. Blind Spot Detection Systems (BSDS), in which a specified zone, or set of zones in the proximity of the vehicle, is monitored for the presence of other road users or hazardous objects, have been developed. A typical BSDS may monitor at least one zone approximately one traffic lane wide on the left- or right-hand side of the vehicle, and generally from the driver's position to approximately 10 m rearward. The objective of these systems is to provide the driver an indication of the presence of other road users located in the targeted blind spot.

Imaging systems have been developed in the prior art, such as discussed above, to perform this function, providing a visual, audio or tactile warning to the driver should a lane change or merge maneuver be attempted when another road user or hazard is detected within the monitored zone or zones. These systems are typically used in combination with a system of rearview mirrors in order to determine if a traffic condition suitable for a safe lane change maneuver exists. They are particularly effective when the detected object is moving at a low relative velocity with reference to the detecting vehicle, since the detected object may spend long periods of time in the blind spot and the driver may lose track of surrounding objects. However, prior art systems are inadequate in many driving conditions.

Known lane departure warning systems typically rely on visually detecting markers on the road on both sides of the vehicle for lane center determination. These markers must be fairly continuous or frequently occurring and generally must exist on both sides of the vehicle for the lane center position to be determined. Failure to detect a marker usually means failure of the departure-warning algorithm to adequately recognize a lane change event.

SUMMARY OF THE INVENTION

The present invention provides a Lane Change Aid (LCA) system wherein the driver of a motor vehicle traveling along a highway is warned if any unsafe lane change or merge maneuver is attempted, regardless of information available through the vehicle's rearview mirror system. The Lane Change Aid (LCA) system of the present invention extends the detection capability of the blind spot detection systems of the prior art.

A vehicle lane change aid system, according to an aspect of the invention, includes a detector that is operative to detect the presence of another vehicle adjacent the vehicle, an indicator for providing an indication that a lane change maneuver of the equipped vehicle may affect the other vehicle and a control receiving movement information of the equipped vehicle. The control develops a position history of the equipped vehicle at least as a function of the movement information. The control compares the detected presence of the other vehicle with the position history and provides the indication when a lane change maneuver may affect the other vehicle.

A vehicle lane change aid system, according to an aspect of the invention, includes an imaging device for capturing lane edge images and a control that is responsive to an output of said imaging device to recognize lane edge positions. The control is operable to distinguish between certain types of lane markers. The control may distinguish between dashed-lane markers and non-dashed-line markers.

A vehicle lane change aid system, according to an aspect of the invention, includes an imaging device for capturing lane edge images and a control that is responsive to an output of said imaging device to recognize lane edge positions. The control is operative to determine that the vehicle has departed a lane. The control may notify the driver that a lane has been departed. The control may further include oncoming vehicle monitoring and side object detection.

A vehicle lane change aid system, according to an aspect of the invention, includes a forward-facing imaging device for capturing images of other vehicles and a control that is responsive to an output of said imaging device to determine an imminent collision with another vehicle. The control may include a wireless transmission channel to transmit a safety warning to the other vehicle. The control may also activate a horn or headlights of the equipped vehicle of an imminent collision.

These and other objects, advantages and features of this invention will become apparent upon review of the following specification in conjunction with the drawings.

DESCRIPTION OF THE PREFERRED EMBODIMENT

Figure 1A:
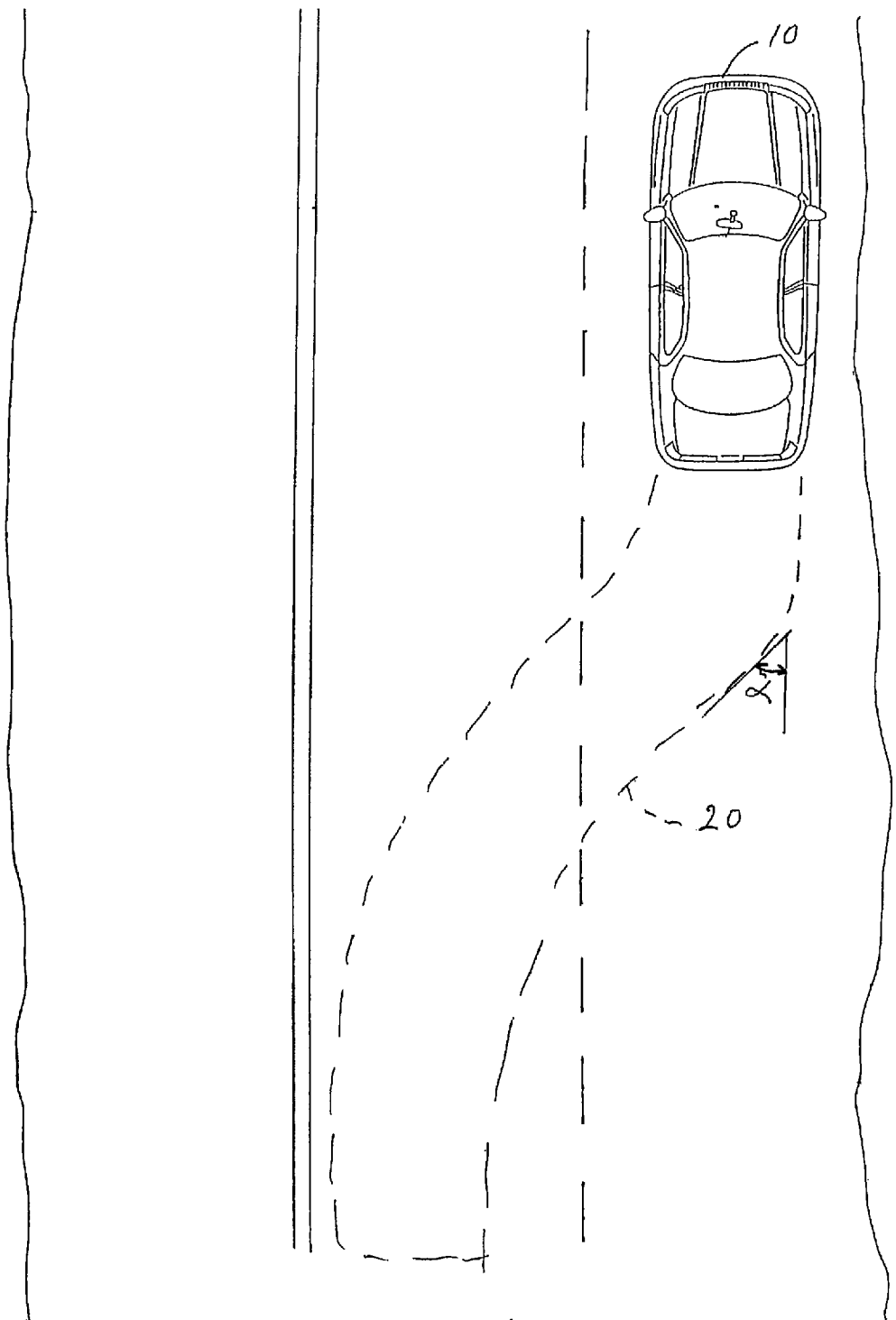
FIGS. 1a-1c are top plan views illustrating a vehicle equipped with a lane change aid system, according to the invention, traveling a straight section of road.

Referring to the drawings and the illustrative embodiments depicted therein, a Lane Change Aid (LCA) system 12 of the present invention as illustrated with a vehicle 10 includes a control 18 and an indicator and/or display system 16 that warns a vehicle operator if an intended, or attempted, lane change maneuver could cause an approaching rearward vehicle to brake and decelerate at an unsafe rate, or that otherwise constitutes a highway hazard. In Lane Change Aid (LCA) system 12, the dimension, in the direction of travel, of a zone 20 to be monitored may be calculated based on an assumed maximum relative velocity between a detecting vehicle and an approaching rearward vehicle, and a safe braking and deceleration assumption. Depending on the assumptions made, the required detection zone may vary in length, such as extending rearward from 50 to 100 m, or more. At 100 m, the road curvature behind the vehicle may have a significant impact on the position of the lane of the detected vehicle, relative to the detecting vehicle. Since it is important to know which lane an approaching rearward vehicle is in, relative to the detecting vehicle, in order to provide the driver an appropriate warning, and to avoid many false warnings, the Lane Change Aid (LCA) system 12 includes developing and maintaining a lane position history 20 for the space rearward of the detecting vehicle.

By combining distance traveled with steering angle, the detecting vehicle path may be plotted. Details of the last approximately 100 m traveled are of value for lane change aids and may be stored by the Lane Change Aid (LCA) system. Data may be stored by several methods including the method described below.

Vehicle speed information in the Lane Change Aid (LCA) system 12 is typically derived from a wheel rotation sensor signal 24, which consists of a number of pulses, n, per revolution of the road wheel, and available on a vehicle data bus 26, such as a CAN or LIN bus, or the like. Sensing and signal detail may vary depending on vehicle design, but for any particular design, a distance, d, traveled between pulses can be established. Also, as each pulse is detected, the current value of the steering angle, +/−α, determined by a steering angle encoder 22 may be read from vehicle data bus 26. Again, the sensing and signal detail may vary depending on vehicle design, but, for any particular vehicle design, an effective turning radius, r, for the vehicle can be established.

Image-based blind spot detection devices and lane change aids, generally shown at 14, are but two of a variety of sensing devices and technologies and devices suitable for the purpose of monitoring the local environment in which a vehicle operates. Radar, infrared, sonar, and laser devices are all capable of interrogating the local environment for the presence of other road users or obstacles to be avoided. GPS systems can accurately determine the vehicle position on the earth's surface, and map data can provide detailed information of a mobile local environment. Other wireless communication systems 28 such as short-range wireless communication protocols, such as BLUETOOTH, can provide information such as the position of road works, lane restrictions, or other hazards, which can be translated by on-board vehicle electronics into position data relative to the vehicle position. Lane Change Aid (LCA) system 12 may integrate all the available information from a multiplicity of sensors including non-image-based detectors 14b, such as a radar sensor, such as a Doppler radar sensor, and at least one image-based detector 14a such as a CMOS video camera imaging sensor, and converts the various sensor outputs into a single database with a common format, so that data from various sources, such as a Doppler radar source and a video camera source, may be easily compared, combined and maintained.

Consider a spherical space of radius R, and center (x, y, z)=(0, 0, 0) in Cartesian coordinates or (r, θ, β=(0,0,0)) in polar coordinates. It is convenient to describe the space in both coordinate systems since several operations will be used to fill the data space and to maintain it and a choice of systems allows for efficient computation methods. Let the center of this space (0, 0, 0) be at the center of the vehicle's rear axle, or nominal rear axle described by the line which passes through the center of the two rear non-steering wheels. Let the horizontal centerline of the vehicle, in the primary direction of travel, lie on (x, 0, 0), such that positive x values describe the space forward of the center of the vehicle's rear axle. Let the rear axle coincide with (0, y, 0), such that positive values of y describe the space to the right of the vehicle centerline when looking forward. (R, 90, 0) describes the positive y axis. Let positive z values describe the space above the centerline of the rear axle. (R, 0, 90) describes the positive z axis. This "sphere of awareness" 20 moves with the vehicle as it moves through space and provides a common frame of reference for all sensed or otherwise derived data concerning the vehicle's local environment.

Figure 1B:
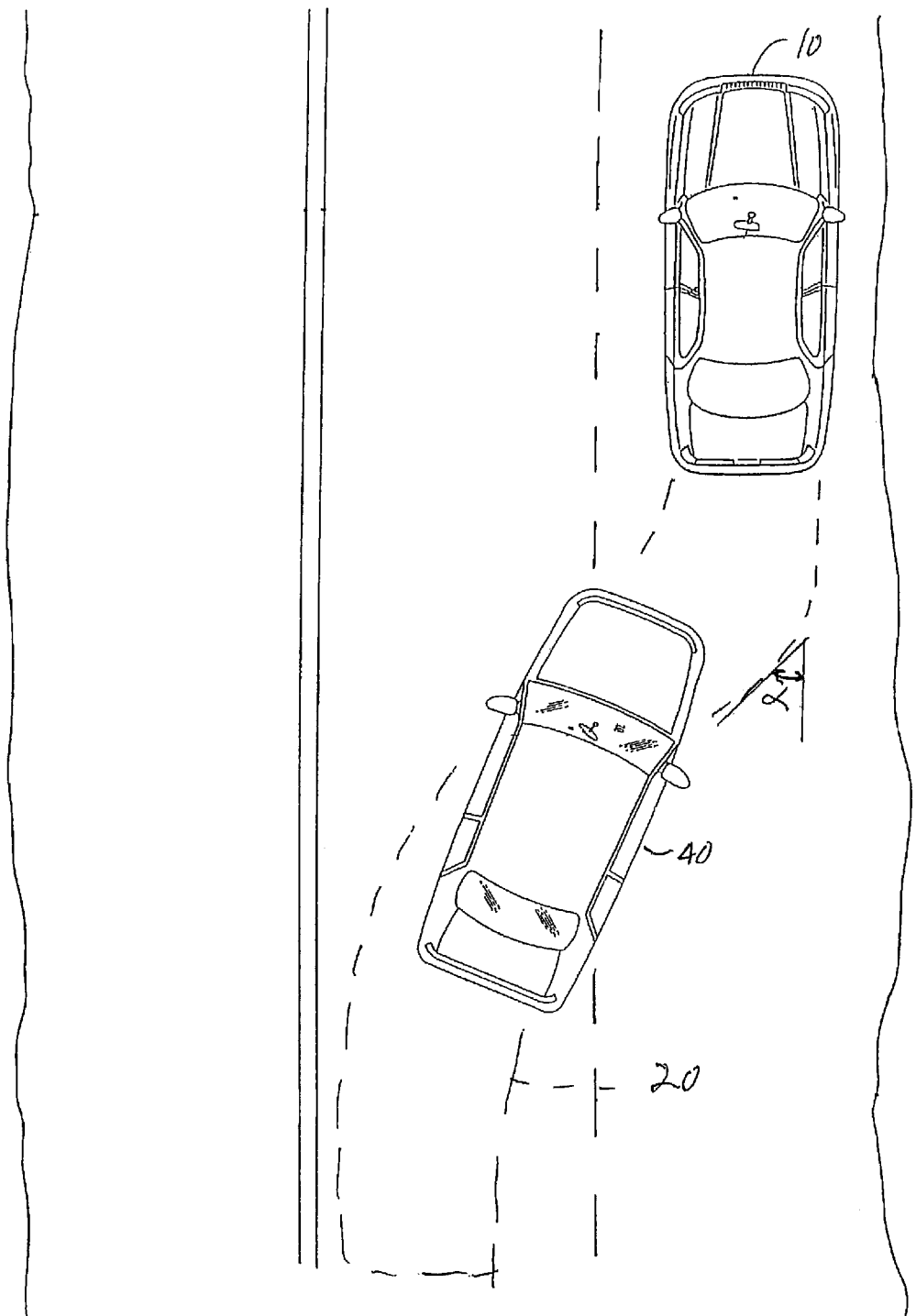
Figure 1C:
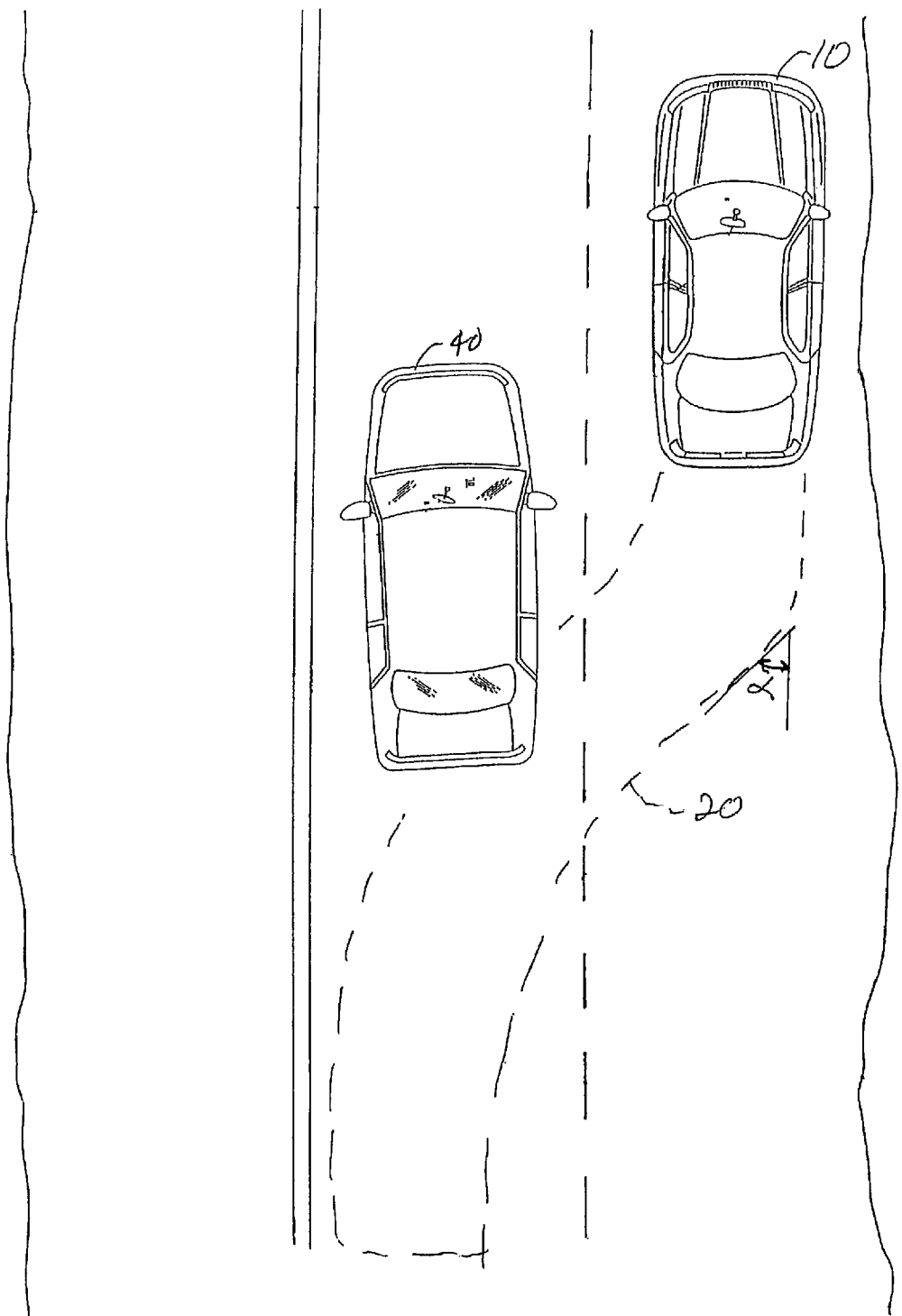
Figure 2:
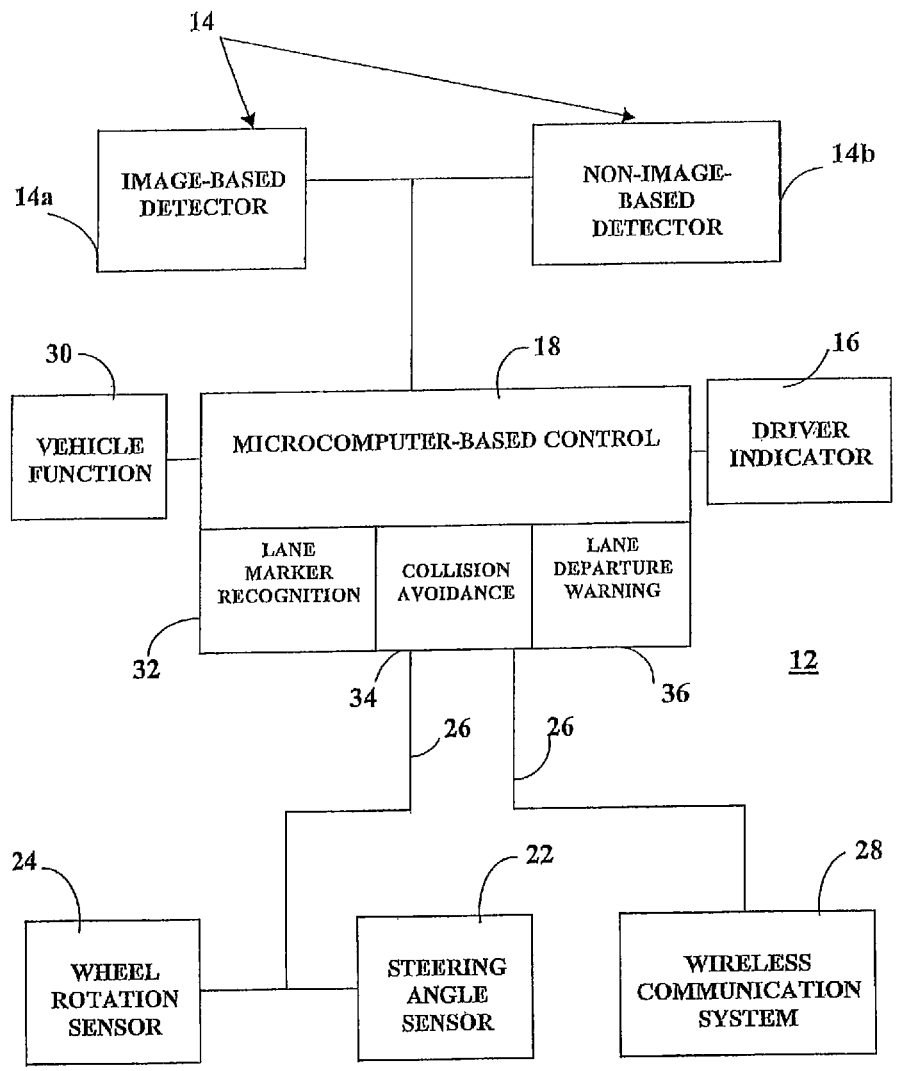
FIG. 2 is a block diagram of a lane change aid system, according to the invention.

For the purpose of storing vehicle path data, which may be used to improve the performance of lane change aid 12, the discussion may be simplified by considering only the horizontal plane. The use of polar coordinates simplifies operations used in this application. The first data point, as the vehicle starts with no history, is at point (0, 0). The steering angle is read from the data bus and stored as $\alpha_0$. When wheel rotation pulse, $p_1$, is detected, steering angle $\alpha_1$ is recorded. Since the distance traveled between wheel pulses is known to be d, a new position for the previous data point can be calculated as $([2(1-\cos \alpha_0)]^{1/2}, (180+\alpha_0))$. This point is stored and recorded as historical vehicle path data. When pulse $p_2$ is detected, the above calculation is repeated to yield $([2(1-\cos \alpha_1)]^{1/2}, (180+\alpha_1))$ as the new position for the previous data point. This requires the repositioning of the original data to $([2(1-\cos \alpha_0)]^{1/2}+[2(1-\cos \alpha_1)]^{1/2}, [(180+\alpha_0)+\alpha_1])$. This process is continued until the distance from the vehicle, R, reaches the maximum required value, such as 100 m in the case of a lane change aid. Data beyond this point is discarded. Thus, a continuous record of the vehicle path for the last 100 m, or whatever distance is used, may be maintained. By maintaining a running record of the path traveled, rearward approaching vehicles detected by a lane change aid image analysis system may be positioned relative to that path as can be seen by comparing the other vehicle 40 in FIGS. 1b and 1c. In FIG. 1b, other vehicle 40 is overlapping zone 20 so an indication of potential conflict may be delayed or discarded. In FIG. 1c, the other vehicle 40 is moving outside of other vehicle 40 and in a blind spot of vehicle 10 so an indication of potential conflict would be given to the driver with indicator 16. Thus, a determination may be made if the approaching vehicle is in the same, adjacent or next but one lane, etc. By this means, the number of inappropriate or unnecessary warnings may be reduced.

Figure 3:
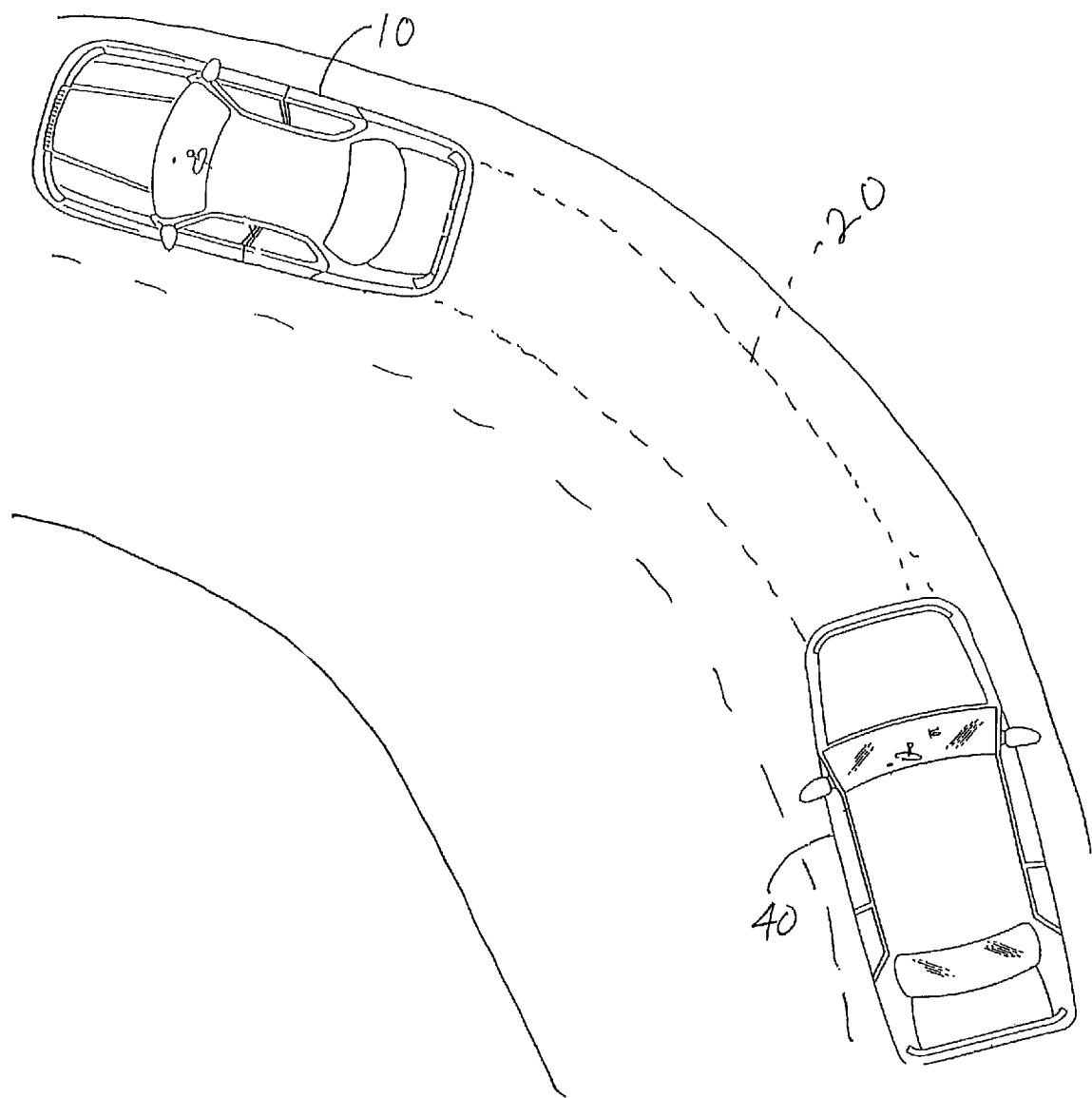
FIG. 3 is a top plan view illustrating a vehicle equipped with a lane change aid system traveling a curved section of road.

Lane change aid system 12 may include a controller, such as a microprocessor including a digital signal processor microcomputer of CPU speed at least about 5 MIPS, more preferably at least about 12 MIPS and most preferably at least about 30 MIPS, that processes inputs from multiple cameras 14a and other sensors 14b and that includes a vehicle path history function whereby, for example, an object, such as a rear-approaching car or motorcycle or truck, or the like, is selected and its presence highlighted to the driver's attention, such as by icons on a dashboard or interior mirror-mounted display, based on the recent history of the side and rear lanes that the host vehicle equipped with the controller of this invention has recently traveled in. An example is over a previous interval of about 60 seconds or less, or over a longer period such as about 3 minutes or more. The vehicle path history function works to determine the lane positioning of an approaching other vehicle, and whether the host vehicle is traveling on, or has recently traveled on, a straight road as illustrated in FIGS. 1a, 1b and 1c, or a curved road portion as illustrated in FIG. 3.

Control 18 may comprise a central video processor module such as is disclosed in commonly assigned provisional patent application Ser. No. 60/309,023, filed Jul. 31, 2001, by Martha A. McMahon entitled VIDEO PROCESSOR MODULE FOR USE IN A VEHICULAR VIDEO SYSTEM, and utility patent application filed concurrently herewith by Martha A McMahon entitled VIDEO PROCESSOR MODULE FOR USE IN A VEHICULAR VIDEO SYSTEM, now U.S. patent application Ser. No. 10/209,181, filed Jul. 31, 2002, and published Feb. 6, 2003 as U.S. Publication No. US2003/0025793, the disclosures of which are hereby incorporated herein by reference. Such video processor module operates to receive multiple image outputs from vehicle-mounted cameras, such as disclosed in commonly assigned patent application Ser. No. 09/793,002, filed Feb. 26, 2001, by Schofield et al. for VIDEO MIRROR SYSTEMS INCORPORATING AN ACCESSORY MODULE, now U.S. Pat. No. 6,690,268, the disclosure of which is hereby incorporated herein by reference, and integrates these in a central processing module to allow reaction to the local vehicle environment. Optionally, and when bandwidth limitations exist that limit the ability to send raw image data, particularly high-resolution images, from a remote camera to a central processing unit across robust transmission means, such as a fiber-optic cable or a high-density wireless link, distributed processing can occur, at least local to some of the image capture sensors. In such an at least partial distributed processing environment, the local processors are adapted to preprocess images captured by the local camera or cameras and any other device such as a Doppler radar sensor viewing a blind spot in an adjacent side lane and to format this preprocessed data into a standard format and transmit this standard formatted data. The data can be transmitted via a wired network or a wireless network or over a vehicle bus system, such as a CAN bus and/or a LIN bus, or the like, to the central processor for effective, centralized mapping and combination of the total local environment around the vehicle. This provides the driver with a display of what is happening in both the right and the left side lanes, and in the lane that the host vehicle is itself traveling in.

In this regard, the vehicle can be provided with a dedicated bus and central processor, as described above, for providing a vehicle environment awareness, which can be both internal such as might be provided by interior cabin or trunk monitors/sensors that determine occupant presence, head position and/or movement, eye movement, air bag deployment, microphone aiming, seat positioning, air conditioning and/or heating targeting, audio controls, and the like, or can be external to the vehicle such as in blind spot detecting or lane change detecting. The present invention includes provision of an automatic environment awareness function that comprises automatic gathering of sensor-derived data collection and transmission in a standard format via a vehicle bus network, said data including data relating to the vehicle environment such as the exterior environment, for example, the presence of rear-approaching traffic in side and rear lanes to the host vehicle as captured by rear-facing CMOS or CCD cameras on the side of the host vehicle, such as included in a side view mirror assembly on either or both sides of the host vehicle and/or as detected by a rear lane/side lane-viewing Doppler radar sensor, and preferably includes processing in a central video processing unit.

The information relating to the external environment can be relayed/displayed to the driver in a variety of ways. For example, a blind-spot vehicle-presence indication can be displayed adjacent the exterior mirror assembly, such as inside the vehicle cabin local to where the exterior mirror assembly is attached to the vehicle door so that the indicator display used, typically an LED flashing light source, or the like, is visible to the driver but not visible to any traffic/drivers exterior to the vehicle, but is cognitively associated with the side of the vehicle to which that particular nearby exterior mirror is attached to, and as disclosed in commonly assigned U.S. Pat. Nos. 5,786,772; 5,929,786; and 6,198,409, the disclosures of which are hereby incorporated herein by reference. Optionally, a vibration transducer can be included in the steering wheel that trembles or otherwise vibrates to tactilely warn the driver of the presence of an overtaking vehicle in a side lane that the driver is using the steering wheel to turn the driver's vehicle into where an overtaking or following vehicle may constitute a collision hazard. Hazard warnings can be communicated to the driver by voice commands and/or audible warnings, and/or by leads-up-displays. The coordinate scheme for data collection of the present invention enables an improved blind spot and/or lane change detection system for vehicles and particularly in busy traffic on a winding, curved road.

The present invention includes the fusion of outputs from video and non-video sensors, such as, for example, a CMOS video camera sensor and a Doppler radar sensor, to allow all-weather and visibility side object detection. The present invention includes the fusion of outputs from video and non-video sensors, such as, for example, a CMOS video camera sensor and a Doppler radar sensor, to allow all-weather and visibility side object detection. The present invention can be utilized in a variety of applications such as disclosed in commonly assigned U.S. Pat. Nos. 5,670,935; 5,949,331; 6,222, 447; 6,201,642; 6,097,023; 5,715,093; 5,796,094; and 5,877, 897 and commonly assigned patent application Ser. No. 09/793,002 filed Feb. 26, 2001, by Schofield et al. for a VIDEO MIRROR SYSTEM INCORPORATING AN ACCESSORY MODULE, now U.S. Pat. No. 6,690,268, Ser. No. 09/372,915, filed Aug. 12, 1999, by Bos for a VEHICLE VISION SYSTEM WITH STEREO IMAGING, now U.S. Pat. No. 6,396,397, Ser. No. 09/767,939, filed Jan. 23, 2001, by Bos for a WIDE ANGLE IMAGING SYSTEM, now U.S. Pat. No. 6,590,719, Ser. No. 09/776,625, filed Feb. 5, 2001, by Schofield et al. for a VEHICLE CAMERA DISPLAY SYSTEM, now U.S. Pat. No. 6,611,202, Ser. No. 09/799,993, filed Mar. 6, 2001, by Bos for a NON-CIRCULAR APERTURE STOP, now U.S. Pat. No. 6,538,827, Ser. No. 09/493,522, filed Jan. 28, 2000, by Bos for an ELECTROCHROMIC APERTURE, now U.S. Pat. No. 6,426,492, Ser. No. 09/199,907, filed Nov. 25, 1998, by Bos for a WIDE ANGLE IMAGE CAPTURE SYSTEM FOR VEHICLE, now U.S. Pat. No. 6,717,610, Ser. No. 08/952,026, filed Nov. 19, 1997, by Schofield et al. for a REARVIEW VISION SYSTEM FOR VEHICLE INCLUDING PANORAMIC VIEW, now U.S. Pat. No. 6,498,620, Ser. No. 09/227,344, filed Jan. 8, 1999, by Schofield et al. for a VEHICLE CONTROL SYSTEM AND METHOD, now U.S. Pat. No. 6,302,545, International Publication No. WO 96/38319, published Dec. 5, 1996, for a REARVIEW VISION SYSTEM FOR A VEHICLE INCLUDING PANORAMIC VIEW, and International Publication No. WO 99/23828, published May 14, 1999, for a RAIN SENSOR WITH FOG DISCRIMINATION, the disclosures of which are collectively incorporated herein by reference.

Lane change aid system 12 may include a lane marker type recognition algorithm, or capability 32. Lane marker type recognition capability 32 utilizes classifying lane markers as one of many specific types for the purpose of interpreting the original purpose of the lane marker and issuing reliable and meaningful warnings based on this interpretation. As an example, a double line on the left side of a left-hand drive vehicle typically indicates a no-encroachment zone or no passing zone. A solid line with adjacent dashed line will indicate either an ability to pass safely if the dashed line is on the near side of the solid line or a do not encroach zone if the dashed line is on the far side of the solid line. Road edges can be distinctly recognized and classified as no-encroachment zones. Conversely, dashed lines may have no significance to lane departure warning algorithms since they merely indicate lane edge positions. Recognizing dashed lines as such gives the ability to not initiate nuisance warnings. The recognition algorithm can further be enhanced by recognizing road features when lane markers are too weak or missing. Features, such as curbs, road seams, grease or rubber slicks, road signs, vehicles in same, neighboring, and/or opposing lanes when recognized, could be used to interpret lane-vehicle positioning and issue intelligent warning alerts to the driver. Fewer false or nuisance type warnings with improved real warning functionality and speed can be realized with this improvement. Operation under difficult lighting and environmental conditions can be extended.

Note that collision avoidance functionality 34 can optionally be achieved using a forward-facing camera 14a in the present invention. For example, should the forward-looking camera detect an oncoming car likely to collide with the vehicle equipped with the present invention, or if another vehicle tries to pull in front of it, the system of the present invention can issue a warning (visual and/or audible) to one or both drivers involved. Such warning can be flash headlights and/or sound car horn. Similarly, the system can detect that the driver of the vehicle equipped with the present invention is failing to recognize a stop sign and/or a signal light, or some other warning sign and the driver can be warned visually, such as with a warning light at the interior mirror in the vehicle cabin, or audibly, such as via a warning beeper, or tactilely, such as via a rumble/vibration transducer that vibrates the steering wheel to alert the driver of a potential hazard.

System 12 may also include a lane departure warning algorithm, or system 36. For example, when a left-hand drive vehicle equipped with system 10 is making a left-hand turn generally across a line on the road. System 36 can monitor for a lane crossing and combine it with detection of an oncoming vehicle. The system 12 may also calculate closing speed for warning of potential impact of closing vehicles.

Also, the vehicle can be provided on its front fender or elsewhere at the front of the vehicle with a side-looking camera as an image-based detector 14a operable to warn the driver when he/she is making a left turn across lanes of traffic coming from his/her left (left-side warning) and then again when he/she is about to enter traffic lanes with traffic coming from his right (right-side warning). While executing this turn, the system of the present invention may utilize the detection of the lane markers when the driver's car is about to enter the specific lane combined with oncoming vehicle detection as a means of predictive warning before he actually enters the danger zone.

System 12 is also capable of performing one or more vehicle functions 30. For example, should the lane departure warning system 36 detect that the vehicle equipped with the system is intending to make or is making a lane change and the driver has neglected to turn on the appropriate turn signal indicators, then the system performs a vehicle function 30 of automatically turning on the turn signals on the appropriate side of the vehicle.

The lane departure warning system 36 of the present invention is operable to differentiate between solid and dashed lines and double lines on the road being traveled. Also, should the vehicle be equipped with a side object detection (SOD) system such as a Doppler radar unit or a camera vision side object detection system that detects the presence of overtaking vehicles in the adjacent side lane, then the SOD system can work in conjunction with the lane departure warning system such that as the lane departure system detects that the driver is making a lane change into a side lane when the SOD system detects an overtaking vehicle in that same side lane, then the driver is alerted and warned of the possible hazard, such as by a visual, audible and/or tactile alert.

As indicated above, the forward-facing camera can include stoplight or sign detection, and the system can further include a broadcast with wireless communication system 28 on a safety warning band when the forward-facing camera detects the stoplight or sign and determines the vehicle is not going to stop based on current speed and deceleration. This would warn crossing drivers of an unsafe condition. Such alerts can dynamically vary depending on road surface conditions (wet, snow, ice, etc.) as visually detected and determined by the forward-facing, road-monitoring camera. For example, wet or snowy roads would change the distance and/or speed at which it would warn based on camera vision recognition of stoplights and/or stop signs. When approaching a stoplight when it changes or the vehicle does not slow down for the light after the driver was warned, the system can blow the horn and/or flash the lights to warn vehicles at the stoplight of the oncoming vehicle. The car may also broadcast one of the safety alerts radar detectors pick up.

Changes and modifications in the specifically described embodiments can be carried out without departing from the principles of the invention, which is intended to be limited only by the scope of the appended claims, as interpreted according to the principles of patent law including the doctrine of equivalents.

This listing of claims will replace all prior versions and listings of claims in the present application:

1. An alert system for a vehicle, said alert system comprising:

a lane departure warning system operable to detect lane markers on a road being traveled by a vehicle equipped with said alert system;

said lane departure warning system comprising a forward facing camera having a field of view that encompasses the road ahead of and traveled on by the equipped vehicle;

wherein said forward facing camera views lane markers on the road being traveled by the equipped vehicle;

a side object detection system operable to detect the presence of another vehicle in an adjacent side lane adjacent to the lane being traveled by the equipped vehicle;

wherein said side object detection system comprises at least one of (a) a radar detector having a field of view to the side of and rearward of the equipped vehicle as it travels along the road and (b) an image-based detector having a field of view to the side of and rearward of the equipped vehicle as it travels along the road;

wherein said at least one of a radar detector and an image-based detector of said side object detection system detects the presence of an overtaking vehicle in the adjacent side lane;

wherein, when said lane departure warning system detects a lane change maneuver of the equipped vehicle towards a side lane and when said side object detection system detects the presence of a vehicle in that side lane, said alert system generates an alert to a driver of the equipped vehicle;

wherein data is received by a processor and wherein said received data comprises image data captured by said forward facing camera and at least one of (i) radar data captured by said side object detection system and (ii) image data captured by said side object detection system; and wherein, responsive to processing by said processor of said received data, said alert system assesses said received data and, responsive to said assessment of said received data and when a lane change maneuver of the equipped vehicle into a side lane is detected and when a vehicle is present in that side lane, said alert system generates said alert to the driver of the equipped vehicle based on a comparison of the presence of the overtaking vehicle with its position history irrespective of activation by the driver of the equipped vehicle of a turn signal indicator of the equipped vehicle at the side of the vehicle adjacent that side lane.

2. The alert system of claim 1, wherein said lane departure warning system differentiates at least one of solid lines, dashed lines and double lines on the road being traveled by the equipped vehicle.

3. The alert system of claim 2, wherein said alert system is operable to detect an oncoming vehicle, and wherein said alert system is operable to detect a lane change maneuver of the equipped vehicle and generate an alert to the driver responsive to a detection of a lane change maneuver of the equipped vehicle and a detection of an oncoming vehicle to alert the driver of a potential impact with an oncoming vehicle.

4. The alert system of claim 1, wherein said side object detection system comprises a radar detector having a field of view to the side of and rearward of the equipped vehicle as it travels along the road.

5. The alert system of claim 4, wherein said detection of the presence of the overtaking vehicle in the adjacent side lane utilizes a vehicle path history.

6. The alert system of claim 1, wherein said forward facing camera comprises a CMOS video camera sensor and wherein said side object detection system comprises a radar detector having a field of view to the side of and rearward of the equipped vehicle as it travels along the road.

7. The alert system of claim 1, wherein said alert comprises at least one of (a) a visual alert, (b) a vibration alert, (c) an audible alert, (d) a voice command and (e) a heads-up-display alert.

8. The alert system of claim 1, wherein said alert system receives an input from a global positioning system, and wherein said alert system generates said alert to the driver of the equipped vehicle at least in part responsive to said input from the global positioning system.

9. An alert system for a vehicle, said alert system comprising:

a forward facing camera having a field of view that encompasses the road ahead of and traveled on by the equipped vehicle;

wherein said forward facing camera views lane markers on the road being traveled by the equipped vehicle;

a radar detector having a field of view to the side of and rearward of the equipped vehicle as it travels along the road;

wherein said radar detector detects the presence of an overtaking vehicle in an adjacent side lane;

wherein data is received by a processor of a control and wherein said received data comprises image data captured by said forward facing camera and radar data captured by said radar detector;

wherein, responsive to processing by said processor of said received data, said processor assesses said received data and, when said processor determines a lane change maneuver of the equipped vehicle towards a side lane and detects a vehicle in that side lane, said alert system generates an output; and wherein, responsive to said output, an alert is generated to a driver of the equipped vehicle based on a comparison of the presence of the overtaking vehicle with its position history irrespective of activation by the driver of the equipped vehicle of a turn signal indicator of the equipped vehicle at the side of the vehicle adjacent that side lane.

10. The alert system of claim 9, wherein said processor, responsive to said image data from said forward facing camera, differentiates at least one of solid lines, dashed lines and double lines on the road being traveled by the equipped vehicle.

11. The alert system of claim 10, wherein said alert system is operable to detect an oncoming vehicle, and wherein said alert system is operable to detect a lane change maneuver of the equipped vehicle and generate an alert to the driver responsive to a detection of a lane change maneuver of the equipped vehicle and a detection of an oncoming vehicle to alert the driver of a potential impact with an oncoming vehicle.

12. The alert system of claim 9, wherein said forward facing camera comprises a CMOS video camera sensor.

13. The alert system of claim 9, wherein said alert comprises at least one of (a) a visual alert, (b) a vibration alert, (c) an audible alert, (d) a voice command and (e) a heads-up-display alert.

14. The alert system of claim 9, wherein said alert system receives an input from a global positioning system, and wherein said alert system generates said alert to the driver of the equipped vehicle at least in part responsive to said input from the global positioning system.

15. The alert system of claim 9, wherein at least one of (a) said forward facing camera comprises part of a lane departure warning system of the vehicle, and (b) said radar comprises part of a side object detection system of the vehicle.

16. The alert system of claim 9, wherein said processor comprises a microprocessor, and wherein said microprocessor processes at a processing speed of at least about 5 MIPS.

17. The alert system of claim 9, wherein at least one of (a) said radar data from said radar detector is received by said processor via a vehicle bus system and (b) said image data from said forward facing camera is received by said processor via a vehicle bus system.

18. The alert system of claim 17, wherein said vehicle bus system comprises at least one of (a) a CAN bus of the vehicle and (b) a LIN bus of the vehicle.

19. An alert system for a vehicle, said alert system comprising:
- a forward facing camera having a field of view that encompasses the road ahead of and traveled on by the equipped vehicle, wherein said forward facing camera comprises a CMOS video camera sensor;
- wherein said forward facing camera views lane markers on the road being traveled by the equipped vehicle;
- a radar detector having a field of view to the side of and rearward of the equipped vehicle as it travels along the road;
- wherein said radar detector detects the presence of an overtaking vehicle in an adjacent side lane;
- wherein data is received by a processor of a control and wherein said received data comprises image data captured by said forward facing camera and radar data captured by said radar detector;
- wherein, responsive to processing by said processor of said received data, said processor assesses said received data and, when said processor determines a lane change maneuver of the equipped vehicle towards a side lane and detects a vehicle in that side lane, said alert system generates an output; and
- wherein, responsive to said output, an alert is generated to a driver of the equipped vehicle based on a comparison of the presence of the overtaking vehicle with its position history, and wherein said alert comprises at least one of (a) a visual alert, (b) a vibration alert, (c) an audible alert, (d) a voice command and (e) a heads-up-display alert.

20. The alert system of claim 19, wherein said alert is generated to the driver of the equipped vehicle irrespective of activation by the driver of the equipped vehicle of a turn signal of the equipped vehicle at the side of the vehicle adjacent that side lane.

21. The alert system of claim 19, wherein said processor, responsive to said image data from said forward facing camera, differentiates at least one of solid lines, dashed lines and double lines on the road being traveled by the equipped vehicle, and wherein said alert system is operable to detect an oncoming vehicle, and wherein said alert system is operable to detect a lane change maneuver of the equipped vehicle and generate an alert to the driver responsive to a detection of a lane change maneuver of the equipped vehicle and a detection of an oncoming vehicle to alert the driver of a potential impact with an oncoming vehicle.

22. The alert system of claim 19, wherein said alert system receives an input from a global positioning system, and wherein said alert system generates said alert to the driver of the equipped vehicle at least in part responsive to said input from the global positioning system.

23. The alert system of claim 19, wherein at least one of (a) said forward facing camera comprises part of a lane departure warning system of the vehicle, and (b) said radar comprises part of a side object detection system of the vehicle.

24. The alert system of claim 19, wherein at least one of (a) said radar data from said radar detector is received by said processor via a vehicle bus system and (b) said image data from said forward facing camera is received by said processor via a vehicle bus system, and wherein said vehicle bus system comprises at least one of (a) a CAN bus of the vehicle and (b) a LIN bus of the vehicle.

\* \* \* \* \*

UNITED STATES PATENT AND TRADEMARK OFFICE
CERTIFICATE OF CORRECTION

| | | |
|---|---|---|
| PATENT NO. | : 8,466,806 B2 | Page 1 of 1 |
| APPLICATION NO. | : 12/483996 | |
| DATED | : June 18, 2013 | |
| INVENTOR(S) | : Kenneth Schofield | |

It is certified that error appears in the above-identified patent and that said Letters Patent is hereby corrected as shown below:

In the Specification

Column 6
Line 38, "leads-up-displays." should be --heads-up-displays.--

Signed and Sealed this
First Day of April, 2014

Michelle K. Lee
*Deputy Director of the United States Patent and Trademark Office*